Aug. 12, 1930.  W. G. HARDEN  1,773,040
DISAPPEARING SCREEN FOR AUTOMOBILES
Filed Jan. 4, 1926   2 Sheets-Sheet 1
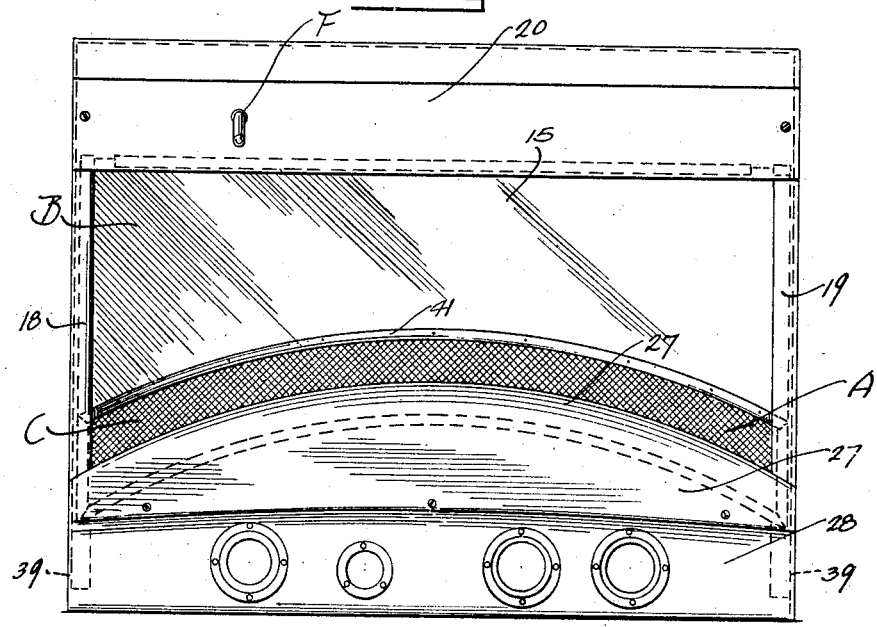
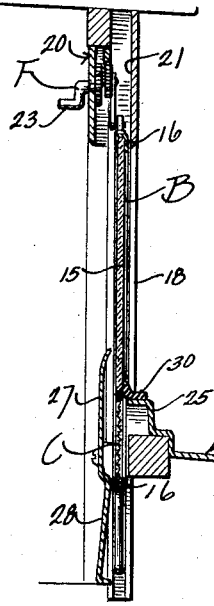
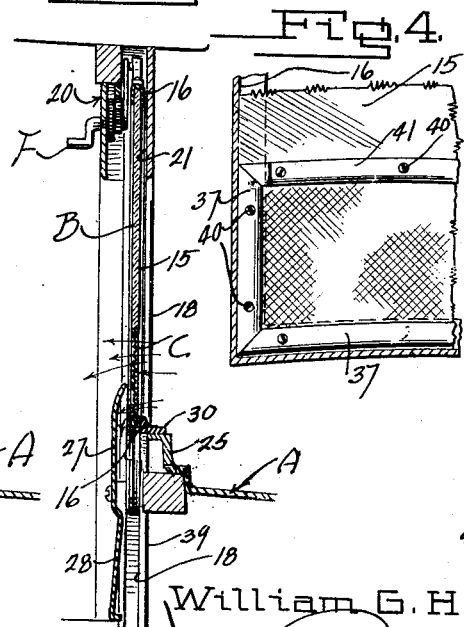
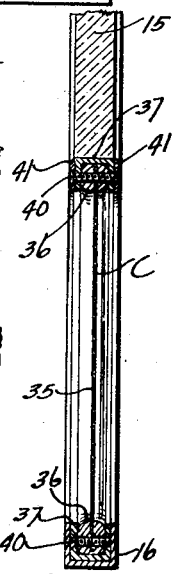
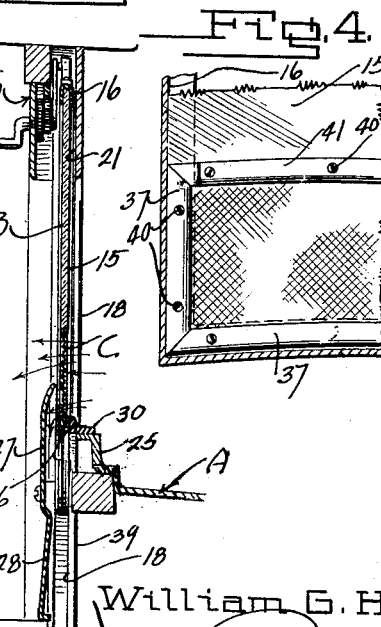
Inventor
William G. Harden
By Lancaster and Allwine
Attorneys

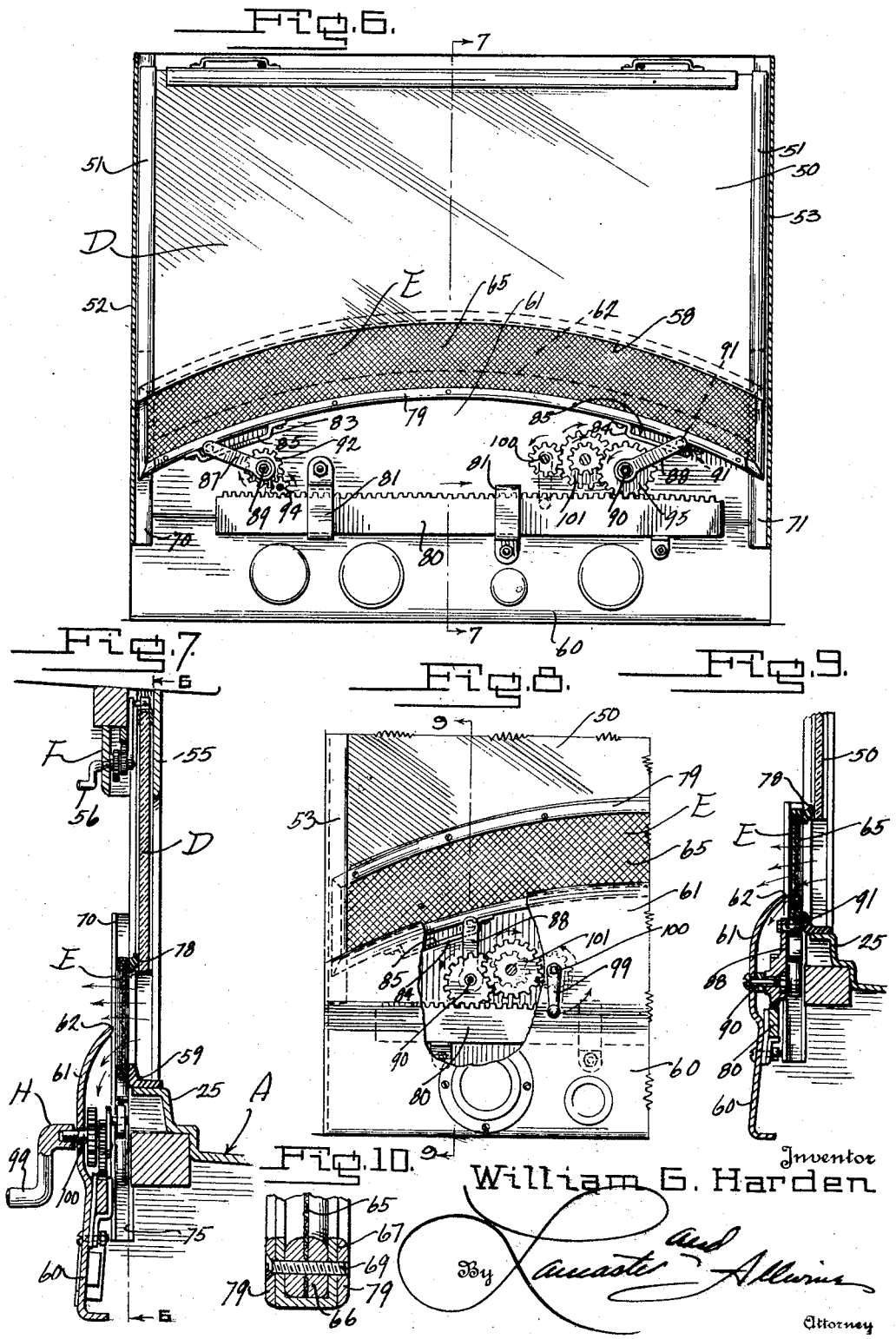

Patented Aug. 12, 1930

1,773,040

UNITED STATES PATENT OFFICE

WILLIAM G. HARDEN, OF ST. JOSEPH, MISSOURI

DISAPPEARING SCREEN FOR AUTOMOBILES

Application filed January 4, 1926. Serial No. 79,249.

This invention relates to improvements in screen constructions for automotive vehicles.

The primary object of this invention is the provision of an improved type of screen construction, for cooperative use with the windshield structure of conventional automotive vehicles, preferably being of the sliding type, and of a nature to disappear into the body of the vehicle when not in use, so as to be elevated when in use and when the windshield is raised; the screen disappearing when the windshield is closed.

A further object of this invention is the provision of a disappearing type of screen for cooperative use with the windshield structures of conventional automotive vehicles, preferably being of the sliding disappearing type which cooperates with the conventional sliding windshield, and which operates in a novel cooperative relation therewith to provide a relatively simple, economical, and compact type of screen structure which is renewable, and which is very durable, capable of resisting head on winds incident to vehicle travel, and of the fine mesh type to keep insects and other foreign particles from passing into the vehicle during driving of the same with the windshield open.

Other objects and advantages of this invention will be apparent during the course of the following detailed description.

In the accompanying drawings, forming a part of this specification, and wherein similar reference characters designate corresponding parts throughout the several views, Figure 1 is a front elevation of the windshield construction and dash of the conventional motor vehicle, showing the vertically movable type of windshield, with the improved disappearing screen cooperatively connected therewith for movement to permit of ventilation of the vehicle when the windshield is open, by providing a screen for said opening.

Figure 2 is a vertical sectional view taken through the improved windshield and screen construction illustrated in Figure 1, showing the screen collapsed and the windshield closed.

Figure 3 is a view of parts similar to the view illustrated in Figure 2, with the windshield elevated and open, and the screen in position over the opening, for the purpose of permitting air to pass directly into the vehicle from in front of the cowl.

Figure 4 is a fragmentary sectional view taken through a corner of the improved screen, in place in the windshield construction.

Figure 5 is a fragmentary vertical sectional view taken through the improved screen, showing its construction and cooperation with the windshield as to mounting.

Figure 6 is a modified form of the invention, showing a windshield of the vertical slidable type, with an improved screen in a cooperative relation therewith, for independent vertical adjustment.

Figure 7 is a sectional view taken through the improved type of windshield illustrated in Figure 6, showing the screen thereof elevated over the opening of the windshield.

Figure 8 is a fragmentary front elevation of details of the improved windshield and screen construction of the form illustrated in Figure 6.

Figure 9 is a sectional view taken substantially on the line 9—9 of Figure 8.

Figure 10 is an enlarged fragmentary sectional view taken through a marginal portion of the improved screen, showing the construction thereof.

In the drawings, wherein for the purpose of illustration are shown preferred and modified forms of the invention, the letter A may generally designate an automotive vehicle, which may include a windshield construction B having a screen C attached therewith for movement. The modified form of invention may include a windshield D and an independently movable screen construction E cooperatively related therewith.

The windshields B and D are preferably of the vertically slidable type, each of the same embodying a mechanism F to cause the elevation or lowering of the same to open the opening at the windshield or to close the opening at the windshield. In the case of the windshield B the screen C is attached therewith for movement by the operating mechanism F, but in the form of invention wherein the screen E is independently movable with respect to its cooperating windshield D, an operating mechanism H is provided for the screen E, preferably being a duplicate of the mechanism F for operating the windshield, but located differently.

The windshield B includes the glass plate 15, having the channel shaped frame 16 marginally protecting the same. It is vertically slidable upon the vehicle by having the side margin portions thereof slidably disposed in the facing grooves of guide standards or posts 18 and 19, which are suitably connected to the body of the vehicle, in manner which may conform to conventional structures. The operating mechanism F of the windshield B is suitably mounted within a casing 20 or behind spaced walls, and in the space 21 between these walls of the casing the windshield B is adapted to elevate in order to open the windshield, and provide an opening between the lower edge of the same and the body of the vehicle. The operating means F is of the conventional type and operates to elevate the windshield B upon turning the crank 23 thereof. At its lower edge the windshield B is preferably concave to conform to the arcuation of the cowl 25 of the body.

In the conventional vehicle having a windshield of the vertically adjustable type, an air shield 27 may be provided above the instrument board, and may be integral with said instrument board, and at its upper margin the same conforms in outline with respect to the lower margin of the windshield D. That is, the upper marginal portion of the air shield 27 is convex as shown in Figure 1 of the drawings, and when closed the windshield B at its lower marginal portion overlaps in front of this shield 27 below the upper convex edge thereof, for a considerable distance, so that when the windshield B is opened to a limited extent, but yet with its lower marginal edge below the top edge of the shield 27, air will be directed downwardly behind the shield 27, and downward to the driver's compartment. A sealing gasket 30, comprising a piece of flexible rubber or the like is disposed on the cowl 25, with a flexible margin portion abutting the outer side of the windshield B, and in position to abut the screen C, to provide a leak-proof connection, without interfering with the positioning with the elevation or lowering of the windshield B and screen C.

The screen C comprises a fine mesh screen body 35, cut to concavo-convex form, having the upper and lower convex and concave margins thereof and the side margins thereof embedded in a reinforcing bead 36, preferably of lead; the bead 36 being of such dimension that a screw threaded opening or other passageway may be provided therethrough without weakening the structure thereof. This screen C is of a renewable nature, and the screen 35 and bead 36 comprise the renewable part, as they are welded or otherwise connected together. The bead portions 36 of the screen C are adapted to be received in the groove of a channel shaped frame 37, which extends in conforming relation with the screen about all of the margin portions thereof.

In order to accommodate the screen C, the channel shaped supporting posts 18 of the windshield are extended below the windshield at their lower ends 39, and the grooves of the said posts, at the portions 39 may receive the side margins of the frame 37 of the screen C therein, for slidable movement.

The channel frame 37 of the screen C is connected with the bead portions 36 of the screen by means of countersunk screws 40 which are transversely extended thru the legs of the channel shaped frame 37 and thru the bead 36. At the upper frame portion along the top margin of the screen C, facing or finishing strips 41 are placed at opposite sides of the frame 37, held in place by the screws 40, and which may be of aluminum or other material, to furnish a finished appearance for the screen at the connection thereof with the windshield B.

The windshield frame 16 is continued across the bottom of the screen frame 37, as illustrated in Figure 5, as means for rigidly connecting the windshield and screen.

As is illustrated in Figure 2, when the windshield B is closed, the lower margin of the windshield, at the frame 16 thereof, lies along the weather strip 30, and the windshield is closed, and no air can circulate into the vehicle from the outside. However, upon operation of the means F, the windshield D is vertically slid upward into the passageway 21 and the lower edge of the shield B elevates above the cowl 25. As the screen C is connected with the windshield B, the same is likewise elevated, and obstructs the opening between the lower edge of the windshield B and the top of the cowl, as illustrated in Figure 3 of the drawings, so that depending upon the elevation of the windshield the wind may enter the driver's compartment directly over the air shield 27, or may pass into the vehicle compartment beneath the air shield 27.

It is to be noted as an important feature of this invention that when the windshield is closed the screen C entirely disappears behind the shield 27 or instrument board 28, and the same is not visible and is in a protected relation, which is very desirable in automotive vehicles, since it is then in position where the same cannot become damaged by passengers or mechanics. The screen C is of a height equal to the height to which the windshield B may be adjusted.

Referring to the modified form of invention illustrated in Figures 6 to 10 inclusive, the windshield D is similar to the construction of the windshield B, and it comprises a plate glass body 50, enclosed at the margins thereof in a suitable frame 51. Channel shaped supporting posts 52 and 53 are provided at opposite sides of the vehicle, having facing grooves for receiving the side frame portions 51 of the windshield D. The windshield D is of the vertical slidable type, and at its upper end is supported in a suitable casing 55, by operating mechanism F which includes a hand crank 56 which the operator rotates in order to slide the windshield along its supports 52 and 53 into elevated or lowered relation with respect to the cowl 25. The lower margin of the windshield body plate 50 is preferably concaved at 58, in conforming relation to the convexity of the cowl 25; the latter preferably having a gasket 59 thereon for receiving the lower margin of the windshield in abutting leak-seal connection.

The vehicle A upon which the windshield D is applied may include also an instrument board 60 and an air shield 61 disposed at the inside of the driver's compartment, and the said air shield 61 at its upper edge 62 being convex, on the same radius as that defining the radius of the top of the cowl or the bottom margin of the windshield D; the upper marginal portion of the air shield 61 extending above the cowl, and in spaced relation therewith, whereby the lower edge of the windshield D may be elevated slightly but yet having its lower edge disposed below the top edge of the air shield 61 to direct air thru the opening left by elevating the windshield, downwardly in front of the air shield 61, and around the instrument board into the compartment of the vehicle.

Referring to the construction of the screen E, the same follows somewhat the construction of the screen C above described, and it includes the concavo-convex shaped screen body 65, of fine mesh gauze, the side edges of which, as well as the top convex edge and lower concave edge, of which are provided with lead or analogous metal reinforcing beads 66, to which the material of the screen body 65, at the margins thereof, may be welded, to provide a renewable screen, which is reinforced by the beads 66.

A channel shaped frame 67 is provided at the side and top and bottom margin portions of the screen E, for receiving the beads 66 therein, and the beads 66 are provided with screw threaded openings transversely therethrough, for alignment with similar positioned openings in the legs of the channel shaped frame 67, for receiving attaching screws 69, by means of which the frame may be attached to the bead of the screen E.

Special vertical channel shaped posts 70 and 71 are provided at opposite sides of the vehicle, in the same plane as the channel posts 52 and 53 respectively, but offset rearwardly therefrom, towards the driver's compartment of the vehicle, and which channel shaped posts 70 and 71 are suitably connected to the body of the vehicle, onto the channels 52 and 53, and provide facing grooves 75 which slidably receive the side frame portions of the screen E, to limit the sliding movement of the screen E to a vertical plane offset rearwardly to the plane of the windshield D, as illustrated in Figures 6 and 9 of the drawings. The channel shaped guide posts 70 and 71 are extended below the top edge of the air shield 61, and behind the same and behind the instrument board 60, and at their upper ends they may be extended above the top edge of the air screen 62 to the proper height.

Ordinarily only the upper frame portion of the screen frame 67 will be visible, and this portion it is preferred to provide with appropriate finishing strips at opposite sides of the frame 67 secured by the screws 69; said finishing strips preferably being aluminum or other strips 79, which may be provided on any portion of the frame of the screen E, as illustrated in Figure 10 of the drawings.

At its upper edge the screen E may be provided with an arcuate strip 78 which may cooperate against the windshield to provide a leak-proof joint.

Referring to the means H which operates the screen E independently with respect to movement of the windshield D, the same includes a transversely slidable rack 80 having teeth along the upper edge thereof, which is supported by suitable brackets 81 for sliding in a horizontal line transversely between the supporting posts 70 and 71; the brackets 81 being carried in suitable manner by the rear surface of the instrument board or air shield, or upon other location of the framework of the automotive vehicle. The screen frame along the lower margin thereof is provided with loop brackets 83 and 84, providing elongated slots 85 extending longitudinally of the screen E, adjacent the ends thereof. Arms 87 and 88 are respectively pivoted at 89 and 90 upon the air screen 61, or cowl construction, the free ends of which are inturned to provide projections 91 which ride within the slots 85. Upon the pin 89 of the arm 87 is provided a gear 92 keyed therewith, and in meshing relation with a gear 94 which meshes with the teeth of the rack 80. The pin 90 providing the pivot for the arm 88 has a gear 95 directly keyed thereto which directly meshes with the teeth of the rack 80, so that it can be seen upon sliding of the rack 80 the arms 87 and 88 will always be moved counter to each other, elevating the screen E or lowering the same.

The operating means H furthermore includes a crank handle 99 detachable upon a shaft 100, and the shaft 100 preferably bears in the air shield 61 and is connected with the gear 95 by a suitable train of gears 101, as illustrated in Figure 6 of the drawings.

The operating means H, with the exception of the crank 99 and its connected shaft projection, is hidden forwardly of the air shield 61 and the instrument board 60, and the connection thereof with the screen E is always hidden, and in an out of the way position where the same is not visible during the elevating or lowering position of the screen E.

From the foregoing description of this invention it is apparent that a novel type of screen construction has been provided for automobile windshield structures, the same being of the disappearing type, when not in use, and being compactly arranged in a novel location and relation with respect to the windshield and automobile body construction.

Various changes in the shape, size, and arrangement of parts may be made to the form of invention herein shown and described, without departing from the spirit of the same or the scope of the claims.

I claim:

1. In combined windshield and screen construction for vehicles the combination with a vehicle including a body having an upwardly bulging convex cowl construction, supporting posts at opposite sides of the cowl extending above the convex surface of the same, a windshield and screen construction slidable upon said posts, the screen construction being disposed below the windshield construction, the lower margin of the windshield construction being concaved, and the screen in length having a concavo-convex appearance adapted to screen the space between the lower margin of the windshield and the top of the cowl when the windshield is elevated above the cowl.

2. In a combined windshield and screen construction the combination with an automobile body including a hood, supporting posts of channel formation secured to the body at opposite sides of the hood having facing grooves therein, said posts extending below the hood into a concealed space in the body of the vehicle, a windshield slidable in the grooves of said supporting posts, means supported by the upper ends of said posts for elevating the windshield to provide an opening below the margin thereof and the top of the hood for ventilating purposes, and a movable screen at the lower portion of said windshield and at its ends being slidable in the grooves of said posts, adapted to extend across the ventilating opening when the windshield is elevated and to extend into the concealed space in the body when the windshield is closed over said hood.

3. In an automobile windshield and screen construction the combination with an automobile body, supporting posts carried by the body at the sides thereof, a windshield construction movably carried by said posts to partially open or entirely close the opening between said posts, a shield instrument board, means to detachably connect the latter to the automobile body facing the driver's compartment to provide a space forwardly thereof between the same and the automobile body opening upwardly towards said windshield, a screen member, means carried by the automobile body for slidably supporting the screen member for substantially vertical sliding whereby the same may be concealed in the space forwardly of said shield and instrument board or lifted upwardly therefrom over the opening provided when the windshield is opened.

4. In a combined windshield and screen construction for vehicles the combination of a vehicle body including a cowl having an adjacent concealed space immediately forward of the driver's compartment with an upper opening facing upwardly from the cowl, supporting posts carried by the body at opposite sides of the cowl, a windshield movable upon said posts, a screen, means to slidably support the screen rearwardly of the plane of the windshield for concealment in said space or for elevation therefrom to extend across the opening left by the windshield when the latter is open, and means carried by the vehicle body facing the driver's compartment for elevating the screen member or lowering the same with respect to said space.

5. In a combined windshield and screen construction for automobiles the combination of an automobile body including a cowl having an adjacent concealed space immediately forward of the driver's compartment with an upper opening facing upwardly from the cowl, supporting posts carried by the automobile body at opposite sides of the cowl, a windshield movable upon said posts, means carried by the posts to raise and lower the windshield with respect to the cowl, a screen, means to slidably support the screen in a plane rearwardly of the plane of the windshield in such relation that it may be moved into said space above mentioned or elevated therefrom to extend across the opening left by the windshield when the latter is open, a weather strip between the upper edge of the screen and the lower margin of the windshield, and means carried by the vehicle body adjacent said screen and facing the driver's compartment for elevating the screen or lowering the same in an independent relation with respect to the windshield.

WILLIAM G. HARDEN.